(12) United States Patent
Eslambolchi et al.

(10) Patent No.: US 6,349,460 B1
(45) Date of Patent: Feb. 26, 2002

(54) FIBER INSTALLATION METHOD AND APPARATUS

(75) Inventors: Hossein Eslambolchi, Basking Ridge, NJ (US); John Sinclair Huffman, Conyers, GA (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/235,013

(22) Filed: Jan. 21, 1999

(51) Int. Cl.[7] .......................... B23Q 17/00; B23P 21/00; B23P 19/00; E03F 3/06
(52) U.S. Cl. ........................ 29/407.04; 29/720; 29/759; 405/155
(58) Field of Search ................. 606/15, 16, 7; 138/97; 29/407.04, 720, 759; 405/155, 158, 170, 184

(56) References Cited

U.S. PATENT DOCUMENTS

| | | |
|---|---|---|
| 4,609,181 A | 9/1986 | Fisher et al. |
| 4,899,988 A | 2/1990 | Mills |
| 5,308,041 A | 5/1994 | Griffioen et al. |
| 5,415,654 A * | 5/1995 | Daikuzono .................. 606/15 |
| 5,456,450 A | 10/1995 | Reeve et al. |
| 5,733,277 A * | 3/1998 | Pallarito ...................... 606/15 |
| 5,951,541 A * | 9/1999 | Simpson et al. ............... 606/15 |
| 5,951,567 A * | 9/1999 | Javier, Jr. et al. ................ 606/7 |
| 5,997,571 A * | 12/1999 | Farr et al. ...................... 606/15 |
| 6,013,072 A * | 1/2000 | Winston et al. ............... 606/15 |
| 6,013,073 A * | 1/2000 | Choukroun ................... 606/15 |
| 6,039,727 A * | 3/2000 | Javier, Jr. et al. ............. 606/15 |

* cited by examiner

Primary Examiner—I Cuda Rosenbaum
Assistant Examiner—Marc Jimenez

(57) ABSTRACT

An optical fiber cable (12) is installed within an enclosure (14) a duct by pushing the cable into the duct via a motorized pushing mechanism (38). As the optical fiber cable enters the enclosure, the image of interior of the enclosure is focused by a lens (22) onto a first end of the optical cable for transmission to the opposite end in which is optical registration with a television camera (24). The television camera captures the image of the enclosure interior for display on a monitor (26) to enable installation personnel to observe any possible narrowing of the enclosure that could impede fiber installation. Upon detecting such a restriction or obstruction narrowing the enclosure, the installation personnel actuate a pair of fingers (28a, 28b) carried by a casing (18) circumscribing the forward end of the optical fiber cable to push outwardly against the interior of the enclosure to reduce the narrowing and facilitate installation of the cable in the enclosure.

7 Claims, 1 Drawing Sheet

FIBER INSTALLATION METHOD AND APPARATUS

TECHNICAL FIELD

This invention relates to a method and apparatus for installing an optical fiber in a buried duct or the like.

BACKGROUND ART

Virtually all telecommunications carriers, such as AT&T, now employ optical fiber cable to carry telecommunications traffic between facilities. As compared to conventional copper cable, optical fiber cable affords much greater bandwidth and virtual immunity from cross talk and interference. Many of the optical fiber cables used by telecommunications carriers are buried underground both for reasons of safety and esthetics. Several different methods exist for burying optic fiber cable underground. For example, some carriers directly plow the cable underground with no protective enclosure. Other carriers first plow a plastic duct underground and then pull the optical fiber cable through the duct via a rope placed in the duct prior to burial.

Direct burial of optical fiber cable incurs several potential hazards. During burial, the plow can sometimes scrape the sheath of the optical fiber, leaving a portion of the sheath exposed. The exposed sheath portion will likely undergo electrolysis, shortening the lifetime of the cable. Direct burial also increases the risk that rocks or other objects in the ground will damage the optical fiber cable during installation.

Installing the fiber by pulling it through the duct following burial can incur difficulties as well. During burial, the duct may twist, restricting or even obstructing its interior cross-section, making it difficult to subsequently install the optical fiber cable in the duct by pulling the rope via a tractor. Unfortunately, no reliable method presently exists to detect such restrictions or obstructions before pulling the fiber through the duct. If the optical fiber encounters such a restriction, a breakaway device that connects the rope to the tractor will snap should the pulling force exceed a prescribed value, say 600 lbs. Once the breakaway device breaks or if the rope snaps, then the duct must be dug up and the restriction or obstruction removed before recommencing fiber installation. Excavation of the duct after burial is time consuming and expensive and invariably will delay fiber installation.

Thus, there is need for a technique for installing an optical fiber cable in a buried duct which overcomes the aforementioned disadvantages of the prior art.

BRIEF SUMMARY OF THE INVENTION

Briefly, the present invention provides a method for installing at least one optical fiber cable through a hollow member, such as a duct or the like, having first and second open ends. A first end of the fiber is pushed into a first end of the duct to install the fiber in the duct. As the fiber is being pushed into the duct, an image of the interior of the duct is captured, typically via a lens in optical registration with the first fiber end. The fiber transmits the image for display, thereby allowing observation of any obstructions or restrictions. In case of a restriction or obstruction, means in the form of a pair of fingers extending outwardly from a housing carried at the first end of the fiber, are actuated to clear the obstruction.

The above-described method affords the advantage that the stress on the fiber incurred by pushing it through the duct is less than by pulling it through the duct as was done previously. Additionally, the present method affords the advantage of enabling installation personnel the ability to observe restrictions and/or obstructions in the duct and the ability to remove them without the need to excavate the duct after burial.

BRIEF DESCRIPTION OF THE DRAWING

FIG. 1 is a block diagram of an apparatus in accordance with a preferred embodiment of the invention for installing an optical fiber cable within an enclosed structure, such as a duct or the like.

DETAILED DESCRIPTION

Figure 1:
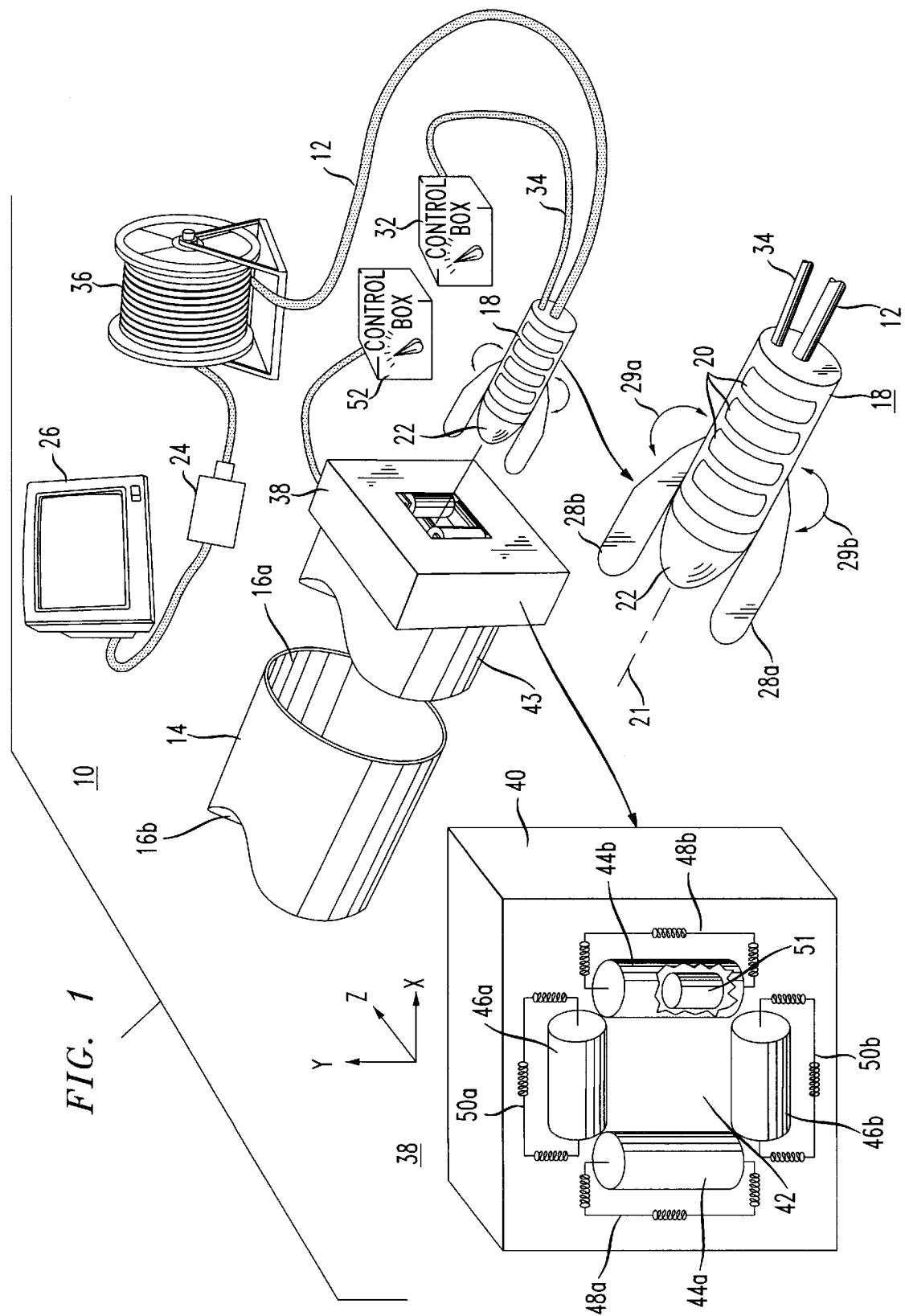

FIG. 1 shows a system 10, in accordance with a preferred embodiment of the invention for installing an optical fiber cable 12 within an enclosure 14, such as a plastic duct, having first and second open ends 16a and 16b. Although not shown, the duct is typically buried underground prior to fiber installation. In practice, the duct 14 has a circular cross-section, but could have other geometric shapes.

The installation apparatus 10 includes a casing 18 that circumscribes a first end of the optical fiber cable 12. The casing 18 has an exterior shape corresponding to that of the cross-section of the duct 14. Thus in the preferred embodiment, the casing 18 is typically cylindrical for receipt with the duct 14 when the latter has a circular cross-section. Mounted in the periphery of the casing 18 are rollers 20, each rotatable about an axis orthogonal to the longitudinal axis 21 of the casing. The rollers 20 serve allow the casing to move freely along the interior bore of the duct 14 while maintaining the casing uniformly spaced within the duct 14 during insertion of the optical fiber cable 12.

The forward end of the casing 18 carries a lens 22 in optical registration with the forward end of the optical fiber cable 12 for focusing the image of the interior bore of the duct 14 into the first end of the optical fiber cable. The optical fiber cable 12 transmits the image of the interior bore of the duct 14 to a television camera 24 in optical registration with the end of the optical fiber cable opposite the lens 22. The television camera 24 operates to magnify the image for subsequent display on a television monitor 26. In this way, installation personnel can observe the interior bore of the duct 14 to detect any restrictions or obstructions that could impede insertion of the optical fiber cable 12.

The casing 18 has a pair of movable fingers 28a and 28b that are typically diametrically opposed and that extend forward from the front of the casing beyond the lens 22. The fingers 28a and 28b each pivot about a separate one of arcs 29a and 29b, respectively to and from the casing axis 21 under the control of a control box 32 coupled to the fingers via a cable 34. A mechanical linkage may couple the fingers 28a and 28b to the control box 32. Alternatively, a solenoid (not shown) may actuate each finger to control its movement in response to electrical signals from the control box 32. In practice, the control cable 34, although shown in FIG. 1 as shorter in length than the optical fiber cable 12 (which is wound on reel 36) is typically as long or longer than the optical fiber cable to facilitate insertion through the duct 14.

Lastly, the installation apparatus 10 includes a mechanism 38 for pushing the optical fiber cable 12 through the duct 14. The pushing mechanism 38 comprises a housing 40 having a central passage 42 for enabling the fiber to pass therethrough. A shroud 43 extends from a first (forward) end of the housing 40 for mating with the duct opening 16a to releasably secure the housing to the duct. At the of the housing 40, a pair vertical rollers 44a and 44b lie on opposite sides of the opening into the passage 42 while a separate one of rollers 46a and 46b lie at the top and bottom, respectively, of the passage opening. Each of rollers 44a and 44b, and 46a and 46b is secured to the housing by one of yokes 48a and 48b, and 50a and 50b, respectively, which spring biases the roller towards the opening into the passage 42 such that the rollers substantially overlie the opening. Normally, the spacing between the rollers of each pair is slightly less that the diameter. (In FIG. 1, the spacing between the rollers of each pair has been exaggerated for purposes of illustration.) A motor rotatably drives each roller, such as motor 51 that drives the roller 44b. The motors associated with each roller pair, such as the motors driving the rollers 44a and 44b, rotate in opposite directions. In this way, the rollers 44a and 44b and 46a and 46b push the optical fiber cable in contact with the rollers through the passage 42 in the housing 40. A control box 52 controls the rollerdriving motors to allow installation personnel to control the motors driving the rollers, and particularly, their absolute speed, as well as their speed relative to each other. Note that the finctionality of the control box 52 could be integrated with the control box 32.

To install the optical fiber cable 14 inside the duct 12, installation personnel first affix the casing 18 to a first end of the optical fiber cable in registration with the lens 22. The second end of the optical fiber cable 12 is affixed in optical registration with the television camera 24 so that the image captured by the lens 22 is carried by the optical fiber cable to the television camera for display on the monitor 26. Also, installation personnel position the pushing mechanism so that the shroud 43 engages the open end 16a of the duct 14. After positioning the pushing mechanism is positioned 38 in operative relationship with the opening 16a in the duct 14, installation personnel then spread apart the rollers 44a and 44b and 46a and 46b to insert the casing 18 through the passage 42 and into the duct 14. After insertion of the casing 18, installation personnel release the rollers 44a and 44b and 46a and 46b to bear against the periphery of the optical fiber cable 12.

After insertion of the casing 18 into the duct 14, installation personnel operate the control box 52 to control the rotation of the rollers 44a and 44b and 46a and 46b to push the optical fiber cable into the duct. Pushing the optical fiber cable 12 through the duct reduces the strain on the cable, as compared to pulling the cable, as taught by the prior art. As the pushing mechanism 38 pushes the optical fiber cable 12 into the duct 14, installation personnel continually watch the monitor 26 to check for any restriction or obstruction within the duct 14 that could impede insertion of the cable into the duct. Upon detecting a restriction or obstruction, installation personnel then actuate the control box 32 to pivot the fingers 28a and 28b, thereby clearing the interior bore of the duct.

The foregoing describes a method and apparatus for installing an optical fiber cable in a duct 14 which affords reduced stress by pushing the fiber through the duct while affording the ability to observe and substantially ameliorate any possible restriction or obstruction, thus avoiding the need excavate the duct in the event of such a restriction or obstruction.

The above-described embodiments merely illustrate the principles of the invention. Those skilled in the art may make various modifications and changes that will embody the principles of the invention and fall within the spirit and scope thereof.

What is claimed is:

1. A method for installing an optical fiber cable for retention in an enclosure having an interior bore in communication with at least a first opening to the enclosure, comprising the steps of:
    pushing a first end of the optical fiber cable into the first opening of the enclosure to install the optical fiber cable therein, while
    capturing via the first end of the optical fiber cable, an image of the interior bore of the enclosure, and transmitting the image via the optical fiber cable for display to enable detection of a narrowing of the interior bore of the enclosure that may impede further optical fiber cable installation; and in the event of detecting such a narrowing;
    applying an outward mechanical pushing force against the interior bore of the enclosure by
        circumscribing the first end of the optical fiber cable in a casing for receipt within the interior bore of the enclosure, the casing having a pair of diametrically opposed outwardly extending pivotally mounted fingers; and
        pivoting the fingers diametrically outward against the enclosure by actuating a control unit situated outside said enclosure and linked to said fingers through a control cable, in response to detecting a narrowing of the interior bore so that the fingers extend against the bore,
    thereby reducing the narrowing to facilitate further fiber installation in the enclosure for retention therein.

2. The method according to claim 1 wherein the pushing step comprises:
    positioning the optical fiber cable between opposed rollers so that the rollers contact the cable; and
    rotating the rollers in opposite directions.

3. The method according to claim 1 wherein the step of capturing the image of the interior bore of the enclosure comprises the steps of:
    placing the first end of the optical fiber cable in registration with a first lens which focuses the image of the interior bore of the enclosure into the first optical fiber cable end for transmission to a second end of the optical fiber cable;
    placing the second end of the optical fiber cable in registration with a television camera coupled to a television monitor for displaying the image.

4. Apparatus for inserting an optical fiber cable for retention in an enclosure having an interior bore in communication with at least a first opening in the enclosure, comprising:
    means for engaging the optical fiber cable to push the optical fiber cable into the first open end of the enclosure;
    a casing for circumscribing a first end of the optical fiber cable, the casing including
        a lens for focusing an image of the interior bore of the enclosure into the first end of the optical fiber cable for transmission to an opposite end of the cable;
        a pair of fingers pivotally mounted to the casing for outward movement from the casing;
        means coupled to the opposite end of the optical fiber cable for displaying the image of the interior bore of the enclosure to allow detection of any narrowing of the bore which may impede installation of the optical fiber cable; and
    control means, including a control unit situated outside said enclosure and linked to said fingers through a control cable for enabling actuation of the fingers on the casing in response to a narrowing of the bore of the enclosure to urge the fingers outward against the interior bore of the enclosure thereby reducing the narrowing to facilitate further fiber installation in the enclosure for retention therein.

5. The apparatus according to claim 4 wherein the means for pushing the fiber comprises:

a housing having a passage therethrough;

a shroud carried by said housing for coupling said housing to said enclosure such that said housing passage communicates with said first opening in said enclosure; and opposed rollers located on opposite sides of said housing passage for engaging the optical fiber cable when inserted through the housing passage and into the enclosure; and means for driving the rollers in opposite directions.

6. The apparatus according to claim 4 wherein the casing has at least one roller mounted to its periphery for guiding the casing within the interior bore of the enclosure.

7. The apparatus according to claim 5 wherein the means for driving the rollers comprises:

a motor for driving each roller; and control means for controlling each motor.

* * * * *